US006812804B1

(12) United States Patent
Rosenberg et al.

(10) Patent No.: US 6,812,804 B1
(45) Date of Patent: Nov. 2, 2004

(54) BROADBAND POLARIZATION FILTER

(75) Inventors: Uwe Rosenberg, Backnang (DE); Werner Speldrich, Backnang (DE)

(73) Assignee: Marconi Communications GmbH, Backnang (DE)

( * ) Notice: Subject to any disclaimer, the term of this patent is extended or adjusted under 35 U.S.C. 154(b) by 0 days.

(21) Appl. No.: 10/049,176

(22) PCT Filed: Aug. 10, 2000

(86) PCT No.: PCT/IB00/01221

§ 371 (c)(1), (2), (4) Date: Jun. 10, 2002

(87) PCT Pub. No.: WO01/13458

PCT Pub. Date: Feb. 22, 2001

(30) Foreign Application Priority Data

Aug. 12, 1999 (DE) .......................................... 199 38 204

(51) Int. Cl.[7] .................................................. H04B 3/04
(52) U.S. Cl. .......................................... 333/21; 333/125
(58) Field of Search .......................... 333/21, 125, 137, 333/110, 126, 202, 113, 111, 204, 219, 99

(56) References Cited

FOREIGN PATENT DOCUMENTS

| | | |
|---|---|---|
| DE | 25 21 956 A | 11/1976 |
| FR | 2 371 065 A | 6/1978 |
| JP | 61198901 | 2/1985 |

OTHER PUBLICATIONS

*Compact Duplexer–Polarizer With Semicircular Waveguide,* IEEE Transactions on Antennas and Propagation, U.S. IEEE., Inc., New York, R. Behe, et al., pp. 1222–1224.
*Waveguide Components for Antenna Feed Systems, Theory and CAD, S. 377–419.*

*Primary Examiner*—Brian Young
*Assistant Examiner*—Joseph Lauture
(74) *Attorney, Agent, or Firm*—Kirschstein, et al.

(57) ABSTRACT

A polarization filter for a high frequency wave guided in a waveguide has an entry section in which wave types that are orthogonally polarized in relation to one another are capable of propagating. The filter also comprises two first exit sections which extend along the length of the entry section, which are separated by a septum, and which are provided for a first wave type. In addition, the filter has two second exit sections which laterally extend in the plane of the septum, which are provided for the second wave type, and which are configured as coaxial conductors.

6 Claims, 3 Drawing Sheets

BROADBAND POLARIZATION FILTER

Figure 1:
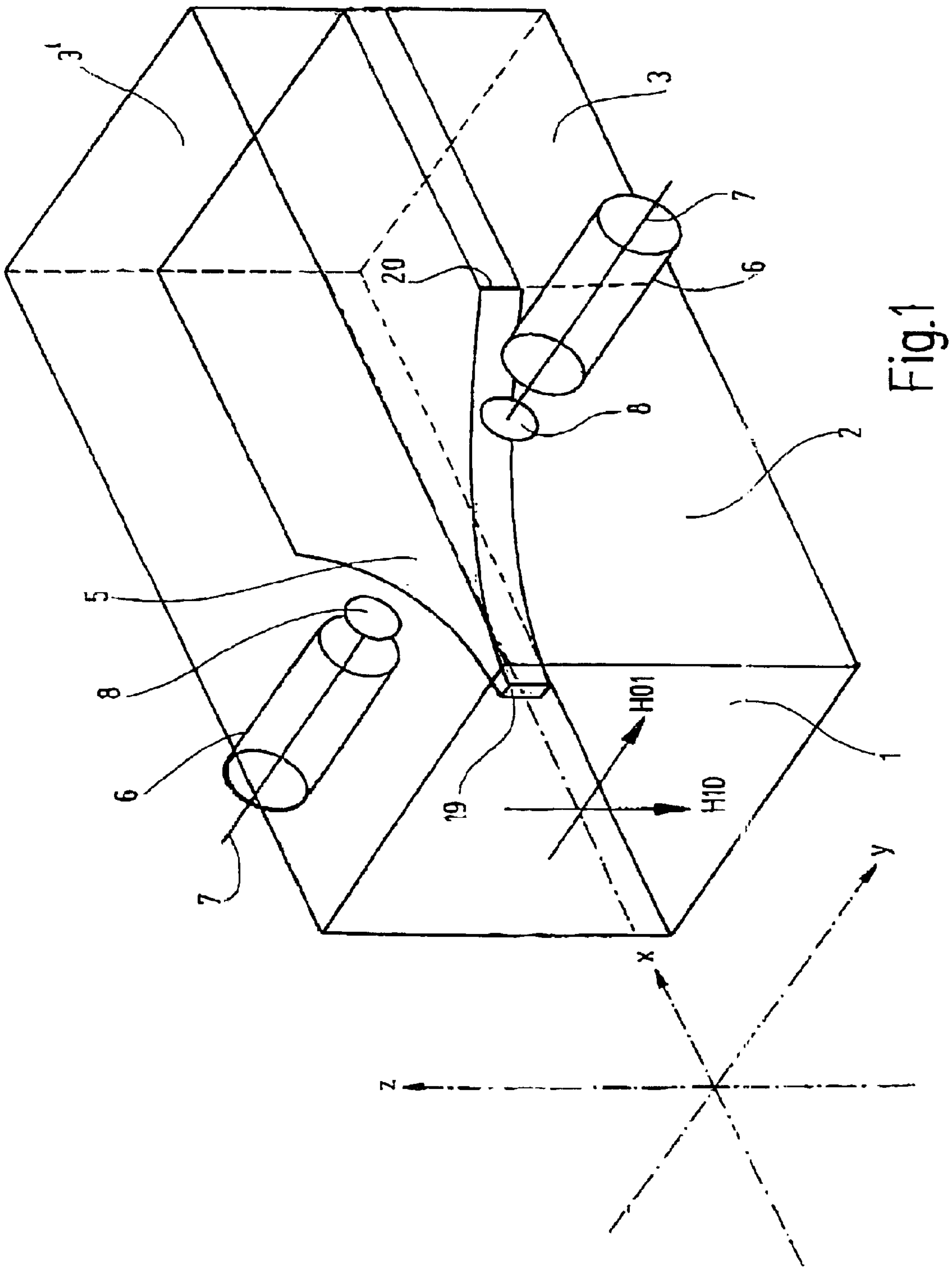

The present invention concerns a polarization separator for separation/combination of orthogonally polarized high-frequency waves, guided in a waveguide, which is usable for extremely large bandwidth.

Different variants are known for combination and separation of orthogonally polarized signals. A review of designs of such polarization separators or combiners is offered in “Waveguide Components for Antenna Feed Systems: Theory and CAD”, Artech House, 1993, pages 377 ff.

Since polarization separators and combiners do not differ in design, but only in the direction in which they are traversed by the electromagnetic wave, the term “polarization separator” is used below for both.

Simple designs are obtained, if only the fundamental wave types H10and H01 are capable of propagation in the common connection waveguide, on which the polarization separator is mounted. This constraint limits the useful frequency band of such variants to about 25%.

Polarization separators with a bandwidth of more than 30% require more demanding designs, in which coupling of higher wave types, capable of propagation in the connection wave guide, is suppressed, because of the symmetry in the branching region of the separator. On page 397 of the aforementioned literature source, a polarization separator with such a symmetric layout is depicted, which has an input section, in which orthogonally polarized wave types are capable of propagating, two first output sections separated by a septum and extending in an extension of the input section for a first of the wave types, and two second output sections extending sideward in the plane of the septum for the second wave type. This design corresponds to a five-gate waveguide branch with two symmetric waveguide pairs that correspond to the first and second output sections, in which the fundamental wave type of each of these output sections couples half of the signal energy of the corresponding polarization of the input section. The first and second output sections are decoupled from each other. The first and second output sections can be combined by appropriate means, like branches, a magic T, etc., so that the two orthogonal polarizations can each be tapped at a terminal or fed into a connection wave guide, when the polarization separator is used to combine two orthogonal polarizations.

The maximum attainable useful bandwidth in this known polarization separator is limited to about 50%. The reason for this is that the wave types within the paired symmetric connection section, whose electromagnetic fields are oriented orthogonal to the corresponding fundamental wave type, are capable of propagation when the frequency of the wave exceeds twice the limiting frequency of the corresponding connection section. If, however, the connection waveguide is capable of transmitting the orthogonal polarization, this principle is no longer applicable, since the short circuit planes required for the wave types are no longer present in the branching zone.

A polarization separator that has ridges on the inside surface of its input section and on four connection sections extending in an extension of the inside wall is known from GB 2 175 145.

The design of this polarization separator is demanding and the fact that all four output sections have the same orientation parallel to the axis of the input section makes the use of complicated connection conductors, oscillated in several planes, essential, in order to combine the orthogonal polarization component occurring at the two output sections.

ADVANTAGES OF THE INVENTION

With the present invention a polarization separator is devised, with which the orthogonal wave types of a common waveguide connected to an input section of the polarization separator can be coupled independently in a very broad frequency band. The width of the frequency band can be 56% and more.

This advantage is achieved in a polarization separator with an input section in which orthogonally polarized wave types are capable of propagating, and two first output sections separated by a septum and extending in an extension of the input section for a first wave type, and two second output sections extending sideward in a plane of the septum for the second wave type, by the fact that the second output sections are designed as coaxial conductors. The septum means that, of the two orthogonally polarized wave types H10, H01 that are capable of propagation in the input section, the one with an E field parallel to the orientation of the septum is reflected. A short circuit plane is therefore formed for this wave type, so that coaxial conductor coupling is carried out at the corresponding field strength maximum in front of the septum. In order to achieve coupling of the wave types with an E field perpendicular to the septum to the first output sections with the lowest possible reflection, it is expedient for the septum to have a front section that tapers into the input section. The second output sections then lead into the input section appropriately between the tip and base of the front section.

In order to increase the uniqueness range of the polarization separator, it is expedient to provide its input section on its walls with inward protruding ridges oriented in the longitudinal direction.

These ridges are expediently lengthened into the first output section on those walls of the input section to which the second output section does not lead, in order to also increase its uniqueness range.

A waveguide provided with such ridges has a lower limiting frequency than a waveguide without the ridges with the corresponding dimensions. The uniqueness range of the waveguide with ridges is therefore greater.

If the input section has no ridges, but the first output sections are designed with ridges because of the large bandwidth, it is expedient to provide a step at the transition between the input section and the first output sections, in which the ridges extend from the step only over part of the length of the input section. The cross section can then be expediently dimensioned, so that the limiting frequencies of the ridgeless part of the input section and the first output sections are the same.

Additional features and advantages of the invention are apparent from the following description of practical examples with reference to the figures.

FIGURES

Figure 2:
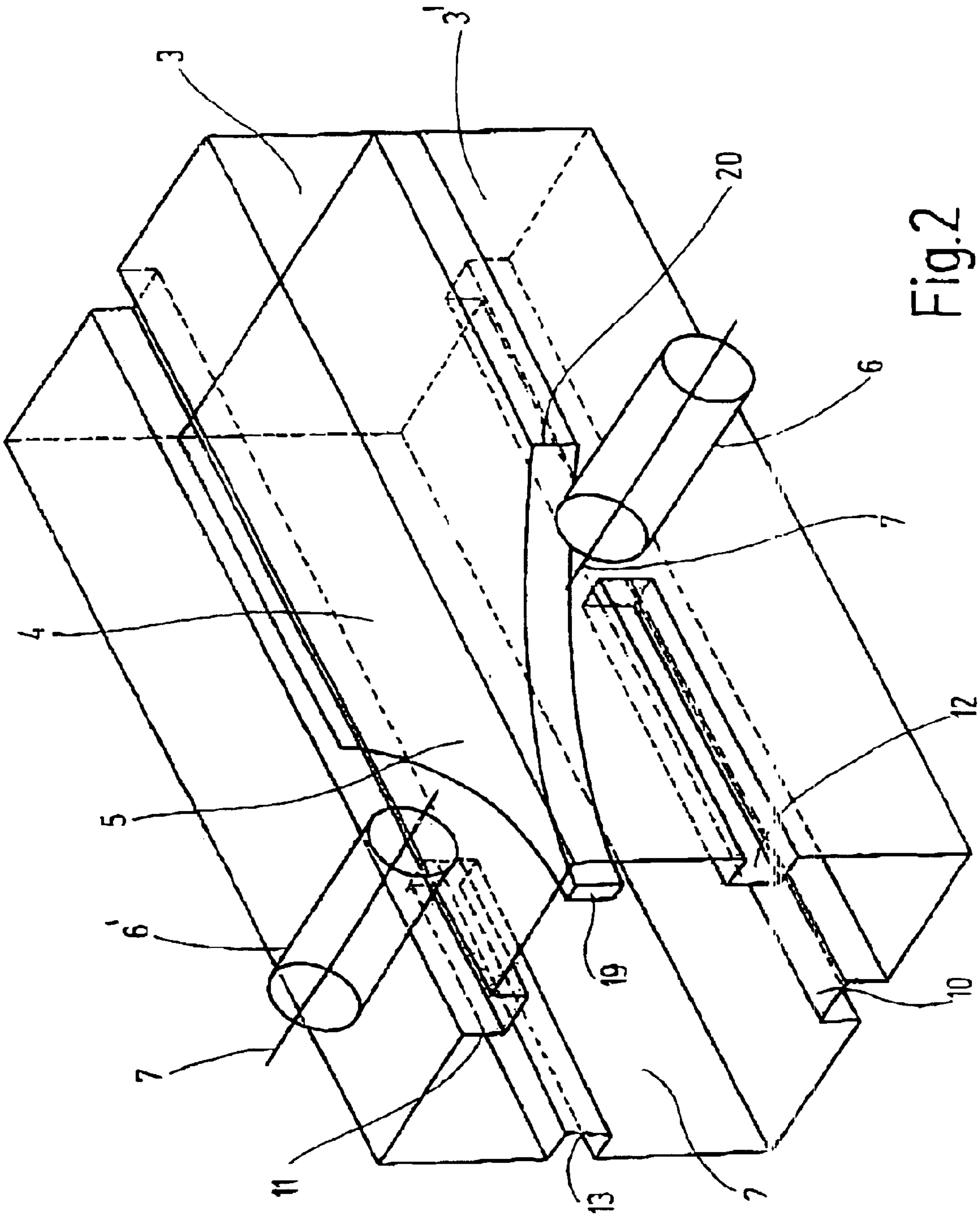
Figure 3:
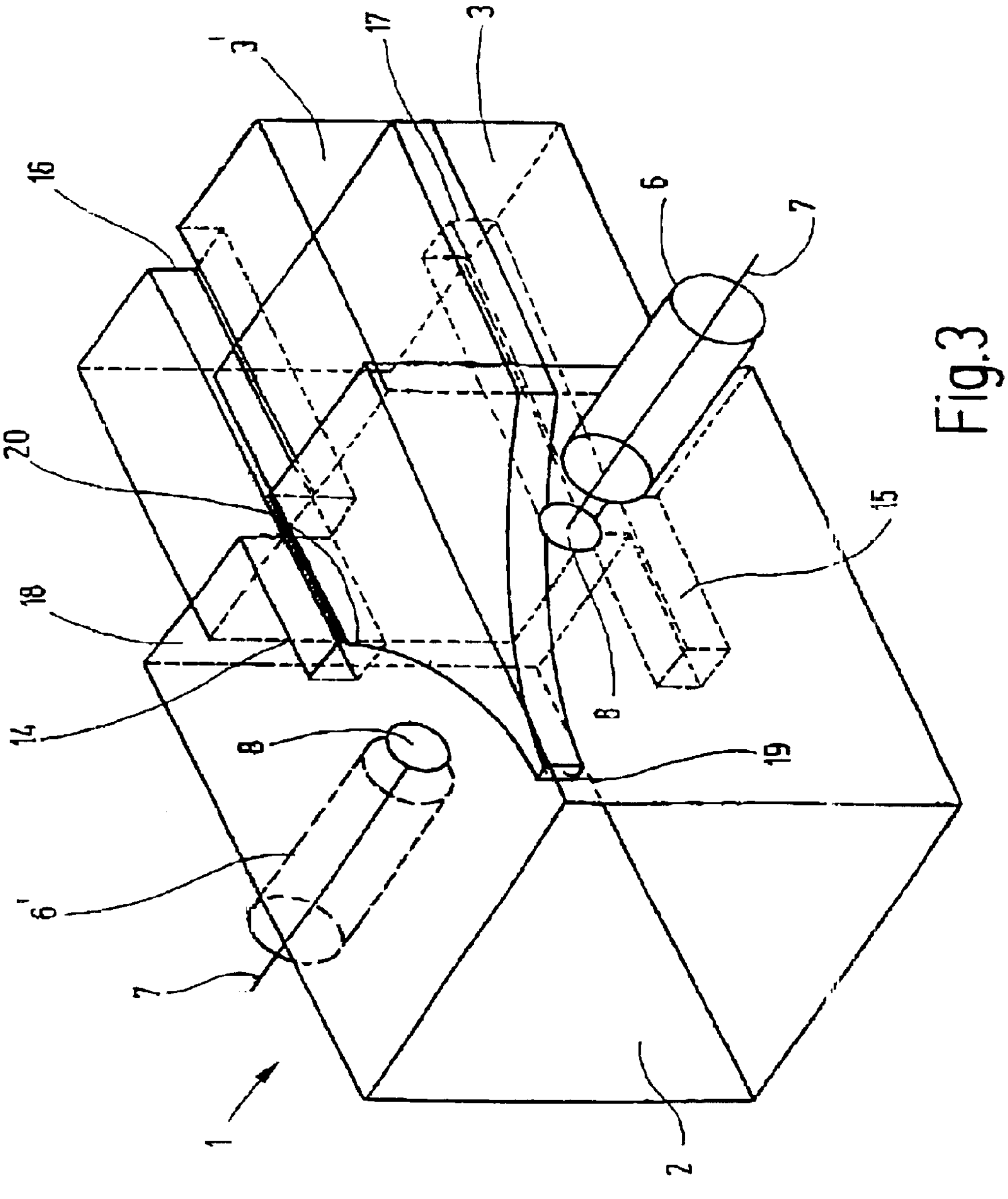

FIGS. 1 to 3 show perspective views of different embodiments of polarization separators according to the invention.

DESCRIPTION OF THE PRACTICAL EXAMPLES

FIG. 1 shows a polarization separator 1 according to a first embodiment of the invention. The polarization separator has a cuboid body with an input section 2 with a square cross section, in which wave types H10 and H01 are capable of propagation, and two first output sections 3, 3' connected to it, which are separated by a partition or septum 4, which may consist of the same conducting material as the walls of the polarization separator. In the first output sections 3, 3', only the wave type H10 is capable of propagation. The cross sections of the two first output sections are identical, so that the energy of an H10 wave entering the input section 2 is divided in equal parts in these two output sections 3, 3'. The H01 wave type, on the other hand, is reflected on septum 4.

In order to keep reflection as low as possible during coupling of the H10 wave type to the first output sections 3, 3', the septum 4 is provided with a front section 5 that tapers to a point in the input section 2. Two output sections 6 in the form of coaxial conductors are arranged on walls of the polarization separator connected by the septum and extend symmetrically perpendicular to the longitudinal direction of the polarization separator, i.e., to the x direction of the coordinate system shown in the figure. The region of the septum in contact with the side wall causes a short circuit for the H01 wave type. The occurring electric field strength maximum that is coupled by the coaxial conductor 6 lies in the region of the septum tip 19. By appropriate shaping of the tip, the coupling function can be optimized for the wide frequency range.

The coaxial conductors 6 couple capacitively to the input section 2 by means of ends of their inner conductor 7 protruding into the interior of the input section 2. These ends do not reach the front section 5 of the septum. To improve their coupling, a bead or thickening 8, made of a conducting material, is provided on the exposed ends of the inner conductor 7. The precise shape of bead 8 is decisive in conjunction with the septum contour for broadband coupling and can be spherical, flat-cylindrical or disk-shape and its diameter is typically much greater than that of the inner conductor, but smaller than that of the entire coaxial conductor.

Relative to the solution known, for example, from GB 2 175 145 A with exclusively branching waveguide gates, this solution has the advantage that the coaxial gates of the second output section 6 have only insignificant reactive effects on the layout of the axial waveguide branch of the first output sections 3, 3'.

Owing to the symmetry of the proposed arrangement, the polarization separator can also be used above the limiting frequency of H20/H02 wave types of the input section or a waveguide connected to it. A prerequisite for this is that no higher wave types are capable of propagation in the first output section, to which the orthogonal wave type H01 of the input section can couple.

A modification of the polarization separator according to the invention is shown in FIG. 2, in which the input section 2 has ridges 10, 11, 12 13 oriented in the longitudinal direction arranged in all four walls in the center. The ridges 10, 11, which extend from the lower or upper wall into the interior of the polarization separator, continue beyond the intersection 2 into the first output sections 3, 3', defined by the septum 4. These ridges therefore cause an increase in uniqueness range both in input section 2 and in the first output sections. The ridges 12, 13, which extend to the lateral walls of the polarization separator in the plane of septum 4, end in the region of the junction of coaxial conductors 6, 6'. The contours of front section 5 of septum 4 and ridges 12, 13 also permit coupling of coaxial conductors 6, 6' over a very broad frequency range, in which galvanic coupling is shown in this example, i.e., the inner conductors 7 of the coaxial conductor are conductively connected to the front section 5 of septum 4.

FIG. 3 shows a practical example, in which the input section 2 is initially designed square and without ridges, the rides 14, 15 only extending onto the upper and lower ends of the input section roughly at the height of the front section 5 of the septum or the junctions of the coaxial conductors 6, 6' into the input section.

Ridges 16, 17, parallel to ridges 14, 15, are formed on an outer wall of the first output sections 3, 3', extending in a continuation of the input section. Since ridge waveguides have lower cross sectional dimensions than undisturbed rectangular waveguides with the same limiting frequency, the first output sections 3, 3' in the practical example of FIG. 3 can be designed with a smaller cross section than in FIG. 1, which does not have the ridges. The first output sections 3, 3' and the input section 2 meet at a step 18 that lies at the height of the base 20 of front section 5 of the septum, i.e., where the side edges of the front section reach the walls. The ridge sections 14, 15 extending from the shoulder 18 into the input section 2 serve for gradual coupling, with the least possible reflection, of the H10 wave type of the input section 2 to the first output sections.

As an alternative, several shoulders can also be provided in the transitional region between the input section and the first output section, and they can also extend beyond the connection region of the coaxial conductors 6, 6' in the direction of a square waveguide connected to the input section 2.

The trend of the front section of the septum can be both continuous, as shown in FIGS. 1 to 3, and also stepped. It is also possible for the septum to have a ridge on its lower and upper side, so that, for example, the first output sections in FIGS. 2 and 3 would each have a ridge on both broad sides. In this case, it is advantageous to design the ridge in the region of the front section also with dimensions that diminish in the direction of the tip 19 of the front section, for example, with continuously diminishing height, or stepped, in order to achieve branching with the lowest possible reflection.

The first and second output sections can now be very simply connected by appropriate means, so that the signal fractions of each polarization are combined and tapped at a corresponding interface, or can be fed during use of the polarization separator as a combiner.

For the first output sections extending in the actual direction of the polarization separator, this can occur simply by using an E-plane branch or by a folded magic T at the end of the septum. It is advantageous if the narrow sides of the first output sections are reduced in the region of the septum, in order to achieve a distinct cross section in the region of the branch or magic T and thus rule out an adverse effect from higher wave types.

The coaxial conductors can be combined by a coaxial coupling device. Another possibility is to join the coaxial conductors with appropriate waveguide transitions, so that the signal can be combined via an E-plane branch or a magic T. In contrast to an exclusive solution in waveguide technology according to the prior art, very long waveguide transformers are avoided here for reduction of the cross section, since a correspondingly reduced cross section for the branch can be considered in the coaxial conductor transition. A very compact design is therefore produced for a polarization separator arrangement.

What is claimed is:

1. A polarization filter for high frequency waves guided in a waveguide, comprising:

a) an entry section in which two orthogonally polarized wave types are capable of propagating, b) two first exit sections for propagating one of the wave types and extending along an extension of the entry section, c) a planar septum for separating the two first exit sections, and d) two second exit sections for propagating the other of the wave types and extending laterally in a plane of the septum, the two second exit sections being coaxial conductors.

2. The polarization filter according to claim 1, wherein the septum has a tapering front section, and wherein the second exit sections lead into the entry section between a tip and a base of the front section.

3. The polarization filter according to claim 1, wherein the entry section has walls with inward protruding ridges oriented along a longitudinal direction.

4. The polarization filter according to claim 3, wherein the ridges on the walls of the entry section, to which the second exit sections do not lead, are lengthened into the first exit sections.

5. The polarization filter according to claim 3, and comprising a step formed at a transition between the entry section and the first exit sections, and wherein the ridges extend from the step only over a part of a length of the entry section.

6. The polarization filter according to claim 1, wherein the coaxial conductors each has an internal conductor that carries a head on an end protruding into the entry section.

* * * * *